(12) United States Patent
Hou et al.

(10) Patent No.: US 6,459,298 B1
(45) Date of Patent: Oct. 1, 2002

(54) STRUCTURE OF CONTROLLED PIPELINE LOGIC

(75) Inventors: Chien-Tzu Hou, Fremont, CA (US); Hsiu-Ying Hsu, Taipei (TW)

(73) Assignee: Geneticware Co., Ltd., Road Town Tortola (VI)

( * ) Notice: Subject to any disclaimer, the term of this patent is extended or adjusted under 35 U.S.C. 154(b) by 0 days.

(21) Appl. No.: 09/924,708

(22) Filed: Aug. 7, 2001

(51) Int. Cl.$^7$ ............................................. H03K 19/173
(52) U.S. Cl. ............................................. 326/46; 326/8
(58) Field of Search ............................. 326/46, 93, 94, 326/8; 327/141, 162

(56) References Cited

U.S. PATENT DOCUMENTS 5,646,555 A * 7/1997 Morinaka .................... 326/93
6,218,861 B1 * 4/2001 Sudo et al. .................. 326/46
6,320,418 B1 * 11/2001 Fujii et al. ................... 326/93

FOREIGN PATENT DOCUMENTS

JP          63135880 A   *  6/1988   ............... 326/46

* cited by examiner

Primary Examiner—Michael Tokar
Assistant Examiner—James H Cho
(74) Attorney, Agent, or Firm—Pro-Techtor International Services

(57) ABSTRACT

A structure of controlled pipeline logic is disclosed. A random noise generator is added to the controlled pipeline logic. Moreover, each combinational logic element of the controlled pipeline logic is appended with an active bit. When no input flows into the controlled pipeline logic, the random noise generator will generate random noises, and the active bit will enforce the combinational logic element to accept the random noise as an input so that the controlled pipeline logic is always sustained in the active condition. The controlled pipeline logic is not exposing the internal functions thereof and avoiding improper monitoring and observation.

4 Claims, 5 Drawing Sheets

STRUCTURE OF CONTROLLED PIPELINE LOGIC

BACKGROUND OF THE INVENTION

1. Field of the Invention

The present invention involves a structure for controlled pipeline logic, especially a structure which makes the controlled pipeline logic always active and prevents the controlled pipeline logic from exposing its inner functions to avoid being improperly monitored and observed.

2. Description of the Related Art

A sequential logic can be considered as being formed by a combination logic path and memory elements. The combination logic path consists of a plurality of logic gates. The feature of the combination logic path is that, because there is no feedback loop or memory element between the input condition and the output condition, there exists the corresponding between two conditions and the output can be directly represented by a combination of the inputs without regard to the previous state.

Currently, the general clock sequential logic, such as a controller, carries on the systematic management with the technology of state machine. The state machine is a mechanism which will sustain the current condition until the next state is inputted. For example, the clock sequential logic and the state machine are formed by combinational logic elements and memory elements. The memory element may be a flip-flop, which is a binary cell for storing one bit of information. Whenever the logic does not power down, the flip-flop in the state machine will indefinitely sustain its binary condition until the input signal makes it transform into directional state.

The most important characteristic of the clock sequential logic lies in the cost of gates and synthesis effort. These two factors are exponentially related to the complexity of clock sequential logic. Referring to FIG. 1, in the condition that clock sequential logic of clock is very simple, the state machine will make very good result due to the short lead-time of the state machine and the convenience for usage. However, as the requirements of clock sequential logic are more complicated, the state machine tends to lose its superiority in low cost and synthesis effort. In addition, when the logic complexity is over a predetermined level, the cost of a clock sequential logic designed by the state machine will be much higher.

Another way of systematic management is the technology of pipeline. Pipeline is a mechanism that can concurrently process several instructions, each of which is divided into several steps, so as to reduce the average executing time of each instruction and improve the efficiency of CPU. Pipeline divides an instruction into several pipe stages or pipe segments and each pipe stage only executes one part of each instruction. The pipe stages are connected one by one to form a pipeline. The difference between the pipeline and the state machine is that the state of the pipeline changes with the clock, while the state machine will sustain at a certain condition until the next instruction is inputted.

The time from the moment of beginning to execute a pipe stage to the moment when the next pipe stage is going to be done is called a machine cycle. Since all pipe stages need to be executed and finished before forwarding the instruction, the period of the machine cycle is determined by the pipe stage with longest delay. That is to say, the pipeline has the shortcoming of time delay. Furthermore, since the pipeline is in the state of executing instruction all the time, the datum, no matter during the process of pipeline stage or as the final result, can be derived by monitoring in real time. And then the mechanism of the system can be predicted.

SUMMARY OF THE INVENTION

Accordingly, the primary object of the present invention is to provide a structure for controlled pipeline logic, which combines advantages of state machine that are convenient to design and easy to use with the pipeline logic that generate great throughput. The controlled pipeline logic is active dynamically thereof so as to avoid improper monitoring and observation.

To achieve the object, the present invention provides a structure of controlled pipeline logic able to deal with many instructions at the same time. The structure comprises a plurality of combinational logic elements responsible for a part of the input. The input and output of each combinational logic element are each connected to a respective flip-flop. A random noise generator regards clock frequency of combinational logic elements and the power consumption as input information to generate random noises so as to emulate the real input. An active condition is set for showing whether the input of the controlled pipeline logic is a real input information or a random noise. So, no matter if the real signal is inputted into the logic or not, and no matter if the logic executes the inner function, controlled pipeline logic keep operating all along. Thus the controlled pipeline logic will not expose its logic functions, as well as avoid improper monitoring and observation.

According to the aforementioned description, the function of the present invention is different from that of the flip-flop in the state machine. The flip-flop serves to determine and execute some specific conditions instead of sustaining in certain conditions. The controlled pipeline logic achieves the advantages of reducing cost and complexity of arrangement and increasing the performance.

The various objects and advantages of the present invention will be more readily understood from the following detailed description with the appended drawing.

DETAILED DESCRIPTION OF THE PREFERRED EMBODIMENTS

Figure 1A:
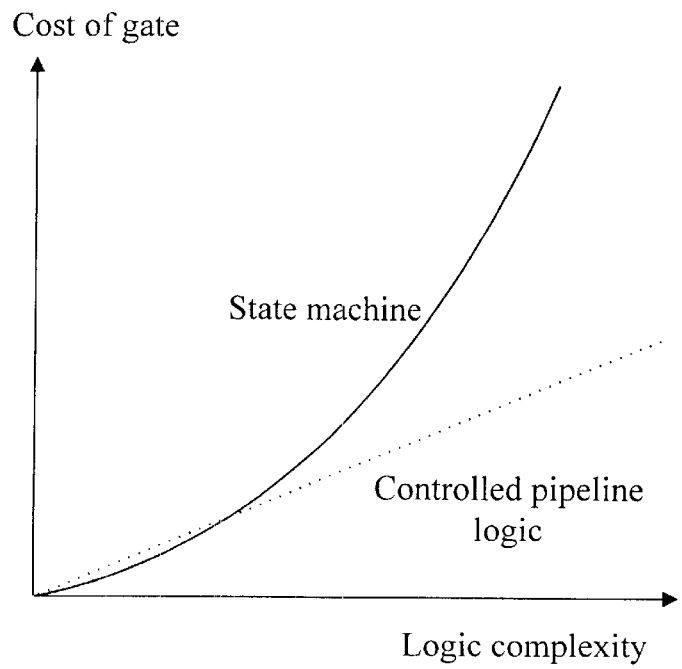
FIG. 1A shows the relation of the logic complexity and cost.
Figure 1B:
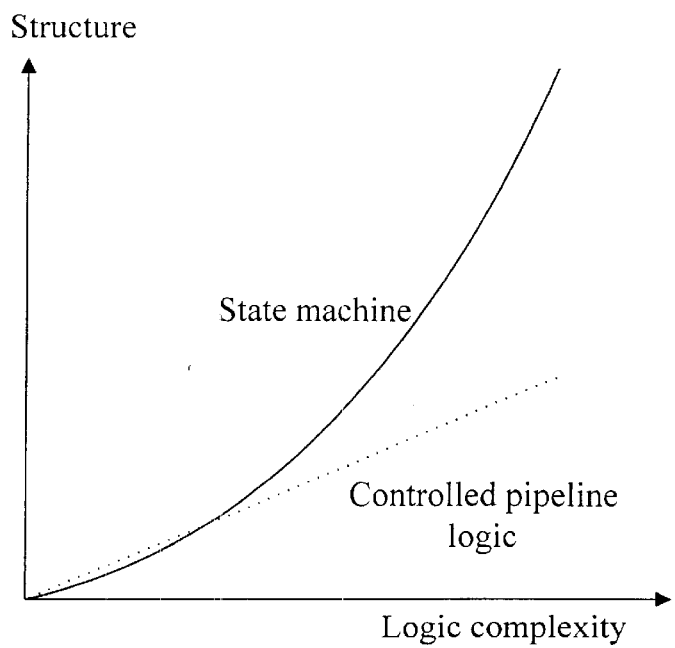
FIG. 1B shows the relation between the logic complexity and the structure of the present invention.
Figure 2:
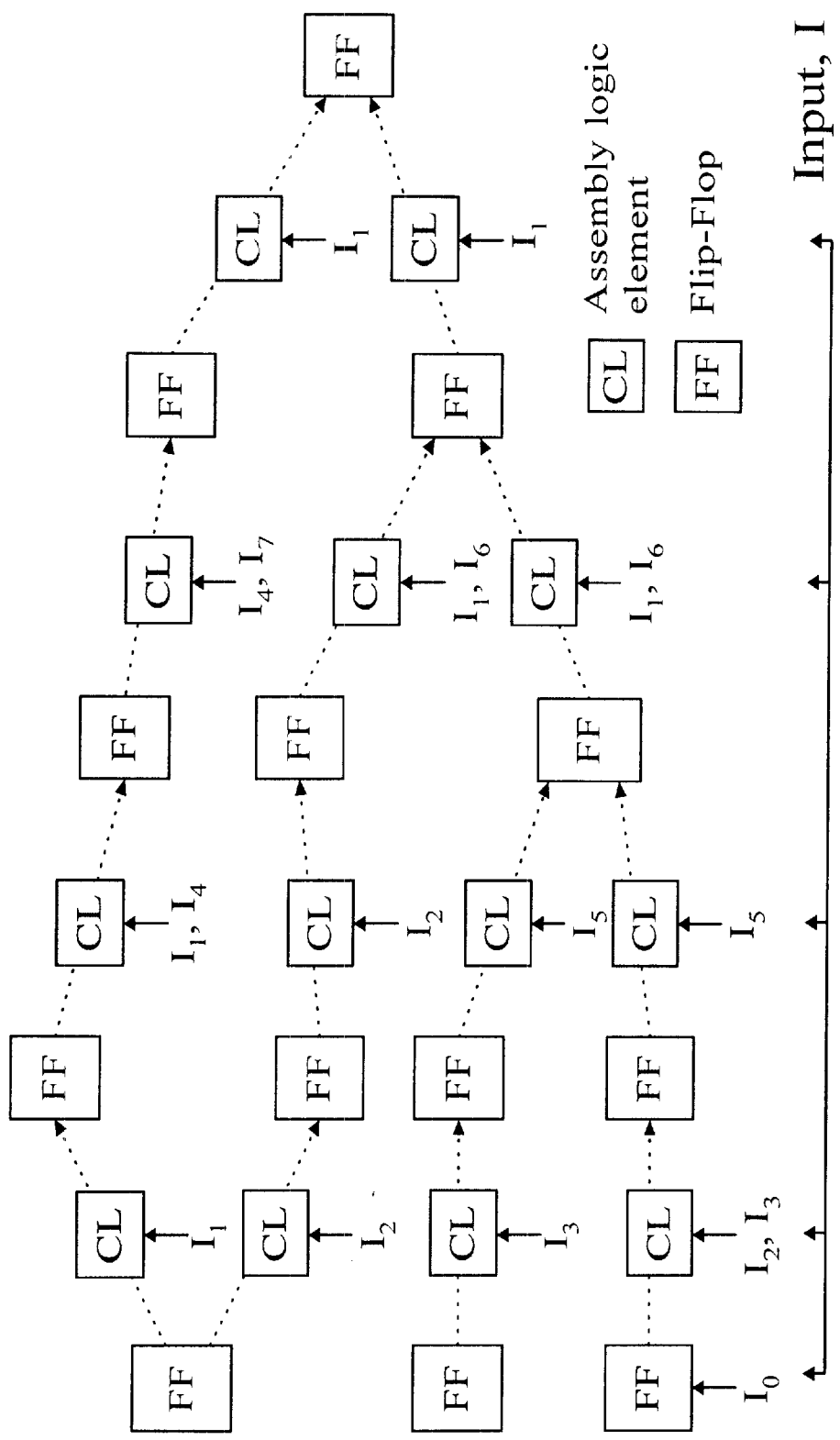
FIG. 2 is a schematic view showing the concept of the controlled pipeline logic according to the present invention.

Referring to FIG. 2, a schematic view on the controlled pipeline logic of the present invention is illustrated. In the drawing, each small square is used to represent a combinational logic element CL, and each rectangular represents a flip-flop FF for storing a bit of data. The dashed line represents a conditional bit for driving the data to different paths.

The controlled pipeline logic of the present invention, which includes a plurality of combinational logic elements CL, is discussed here in below.

The input and output of each combinational logic element CL are connected to respective flip-flops FF. Each flip-flop FF serves to determine the transferring of data which can be in an active or inactive condition. In each own path, the data will pass each of the different combinational logic elements CL, while each combinational logic element CL only executes a part of the input signal.

Figure 5:
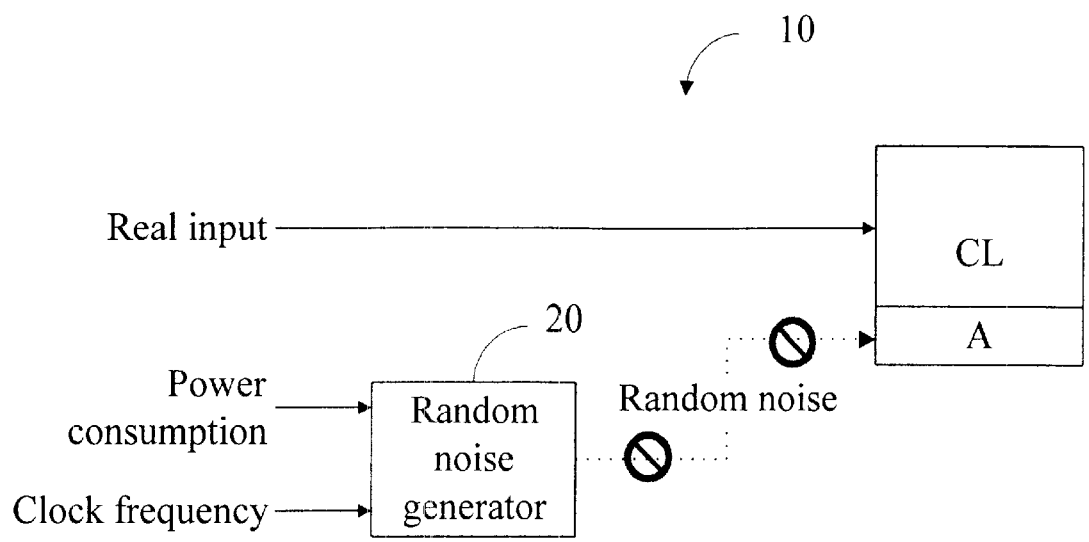
FIG. 5 is a schematic view showing the signal receiving condition of a combinational logic element as inputs flow into the logic elements.

A random noise generator 20 (referring to FIG. 5) regards the clock frequency and the power consumption as input factors and is used to generate random noises to simulate inputs which flow into the combinational logic element CL.

The active bit A has active condition and inactive condition for controlling the combinational logic element CL to accept a real input or be forced to accept a random noise.

Figure 3:
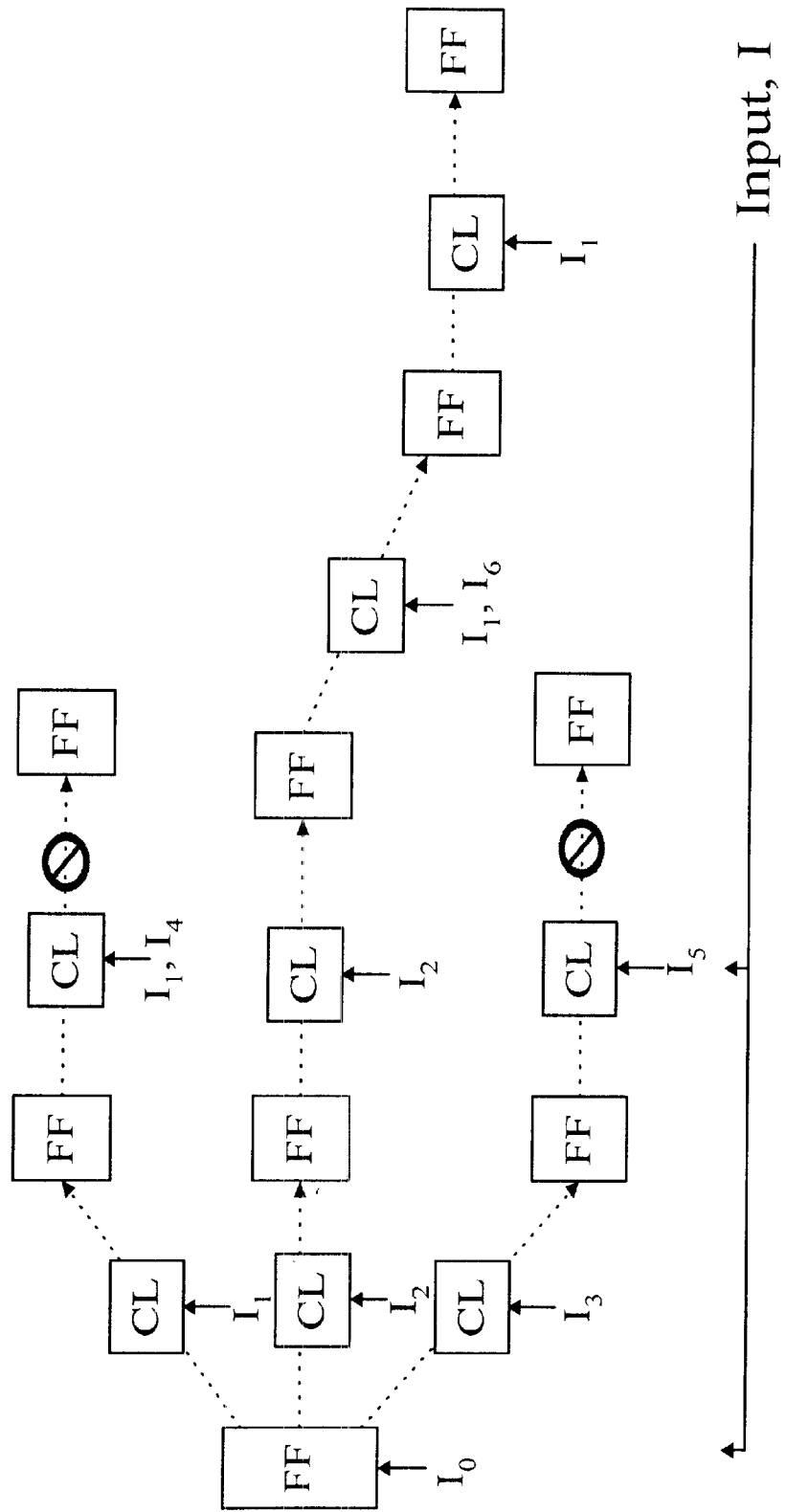
FIG. 3 is a schematic view for determining the data flow path according to FIG. 2.

In the following, FIG. 3 is used as an example for describing the operation of the controlled pipeline logic 10. It has the following advantages:

1. The controlled pipeline logic 10 overlaps a plurality of instructions. The flowing path is determined by the input of each pipe stage. The different inputs of the flip-flop FF will induce the data to flow to different paths. In general, some external inputs ($I_1$, $I_2$, ...) are needed to determine the flowing path of the data. However, other than the state machine which is just waiting, the pipeline still executes all the other operations. Before the controlled pipeline logic 10 determines the certain flowing path, the data can flow to any possible path (referring to FIG. 2). Once a path is determined, the execution in a fault path will be stopped (such as inputs I1, I4, and I5 in FIG. 3 which are fault paths). Therefore, no delay will occur.

2. The controlled pipeline logic 10 is formed by a plurality of smaller combinational logic elements CL instead of a large combinational logic element in a state machine for receiving all inputs. Assuming that a controlled pipeline logic 10 totally processes 10 inputs, the combinational logic elements CL in the controlled pipeline logic 10 are unnecessary to execute all the 10 inputs as in the state machine, whereas each combinational logic element CL is responsible for a part of inputs, that is to say, each combinational logic element CL just has less than 10 inputs.

Figure 4:
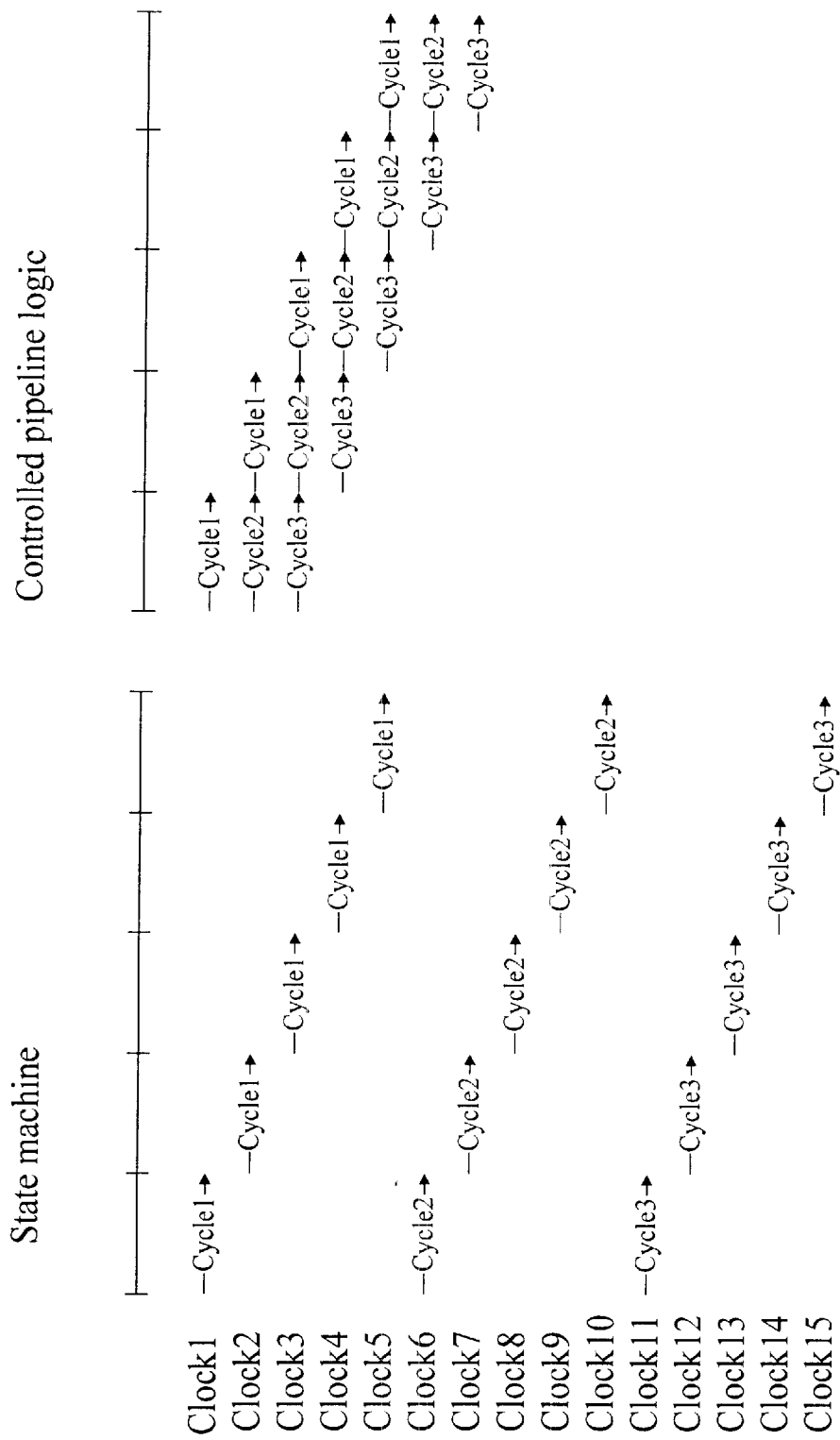
FIG. 4 is a schematic view showing the clock of a state machine and a controlled pipeline logic.

3. The small combinational logic element CL in the controlled pipeline logic 10 is only responsible for a part of the input signal. Therefore, as long as some combinational logic elements CL are idle, the controlled pipeline logic 10 will keep accepting the input instruction correspondent to the combinational logic and executing the instruction. For example, suppose that the logic operation has three cycles which are formed by five clocks, to the state machine, 3 cycles would need 15 clocks. Furthermore, the next cycle will not start before the previous cycle is completed. However, to the controlled pipeline logic 10, only seven cycles are served. Once the cycle 1 accomplishes its clock 1, the cycle 2 immediately starts its own first clock without waiting for the accomplishment of all the clocks of the cycle 1. Therefore, three cycles having different clocks may simultaneously execute its input instruction (referring to FIG. 4).

4. The clock sequential logic formed by many small combinational logic elements CL and memory elements (such as flip-flop FF) may be designed more easily than the state machine. That is because the memory elements formed by the controlled pipeline logic 10 only need to decide, in some environments, whether it is in an active or inactive condition. Moreover, each small combinational logic element CL only executes a part of the input signal and therefore it eliminates the unnecessary input gate so as to reduce the logic complexity.

5. Different from the state machine that sustains a state until the next input signal is received, the representation of the controlled pipeline logic 10 is discontinuous, which can be in an active or inactive condition. Once inputs or instructions flow into the combinational logic element CL, the controlled pipeline logic may execute the input or instruction continuously. However, if no input flows into CL, the controlled pipeline logic 10 is inactive or idle.

In order to protect the clock sequential logic from being improperly monitored and observed, a random noise generator 20 in the present invention is added to the controlled pipeline logic 10, and moreover, each combinational logic element CL of the controlled pipeline logic 10 is appended with an active bit A. In this embodiment, in the inactive condition, the active bit is set as "0", while in the active condition, it is set as "1".

For the purpose of brevity, in the following, only one combinational logic element CL in the controlled pipeline logic 10 is described. In general, when inputs flow into the logic, the random noise generator 20 is inactive and the active bit A of the combinational logic element CL is set to "0", namely, in an inactive condition. At this time, the combinational logic element CL only accepts real inputs (referring to FIG. 5).

Figure 6:
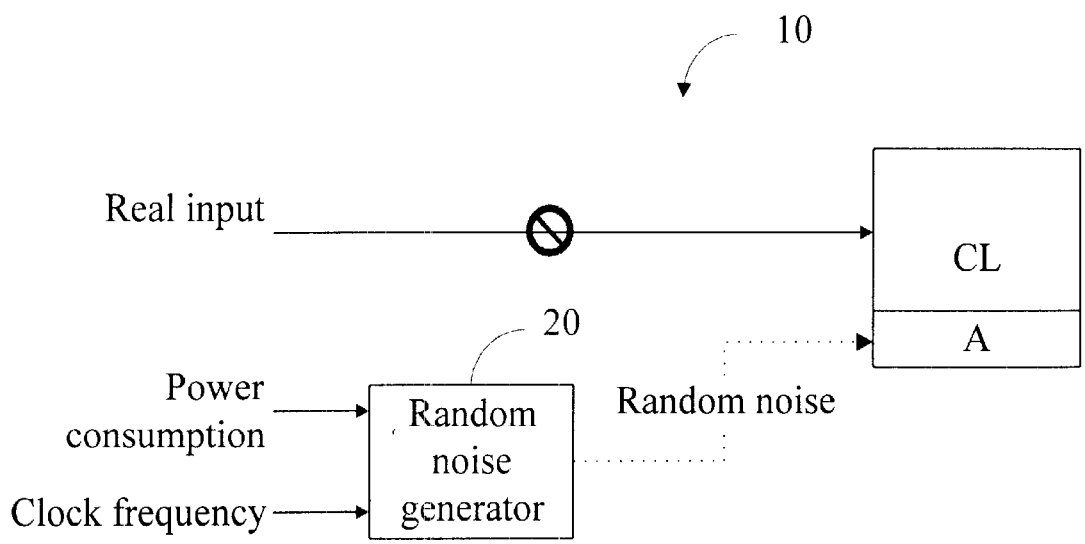
FIG. 6 is a schematic view showing the signal receiving condition of a combinational logic element as no input flows into the logic elements.

Referring to FIG. 6, when the controlled pipeline logic 10 has no real input, the random noise generator 20 will produce the emulation signal to input into the controlled pipeline logic 10. The active bit A will be converted into an active condition of "1" so that the combinational logic element CL only receives the input of the random noise.

Therefore, no matter whether the real input flows into the controlled pipeline logic 10, and no matter whether the controller is executing normal internal function, the unauthorized agent can only detect that the controlled pipeline logic 10 is always in an active condition. That is to say, it is in vain to predict the internal operation of the controller. Through these features, the controlled pipeline logic of the present invention is superior to the state machine in view of performance, security, and so on.

In summary, the controlled pipeline logic of the present invention has a great deal of merits of the state machine, such as the shortest lead-time, the convenience for using, and so on, while obtaining advantages of high throughput of CPU in the pipeline. Moreover, by the setting of the random noise generator and active bits, the controlled pipeline logic can be sustained in an active condition, and then the inner functions of the controlled pipeline logic will not be exposed so as to avoid being monitored and observed improperly. As a result, the present invention has overcome the disadvantages of the prior art state machine and pipeline.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A structure of controlled pipeline logic for overlapping a plurality of instructions, a flowing path being determined according to inputs of each pipe stage; comprising:

a plurality of combinational logic elements responsible for part of said inputs; an input and an output of each combinational logic element being connected to respective flip-flops;

a random noise generator for generating a random noise as a simulation signal to input said combinational logic element; and an active bit having an active state and an inactive state for controlling said combinational logic element to accept a real input or be enforced to accept said random noise;

wherein by said combinational logic elements and said flip-flops, a plurality of data flowing paths are formed; when no input flows into said controlled pipeline logic, said random noise generator will generate random noises, and the active bit will enforce said combinational logic element to accept the random noise as an input so that said controlled pipeline logic is always sustained in said active condition.

2. The structure of controlled pipeline logic as claimed in claim 1, wherein said flip-flop serves to determine a flowing condition of the data.

3. The structure of controlled pipeline logic as claimed in claim 1, wherein the clocks of the combinational logic element and the power consumption are used as factors for generating random noises.

4. The structure of controlled pipeline logic as claimed in claim 1, wherein before determining the flowing path by the controlled pipeline logic, multiple data flow to any possible path; once a path is determined, data flows in a fault path will be stopped.

\* \* \* \* \*